(12) United States Patent
Suzuki et al.

(10) Patent No.: US 9,140,464 B2
(45) Date of Patent: Sep. 22, 2015

(54) HEATING MEDIUM UTILIZING APPARATUS

(71) Applicant: Mitsubishi Electric Corporation, Tokyo (JP)

(72) Inventors: Kazutaka Suzuki, Tokyo (JP); Kei Takeyama, Tokyo (JP); Takuya Suenaga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 187 days.

(21) Appl. No.: 14/037,485

(22) Filed: Sep. 26, 2013

(65) Prior Publication Data

US 2014/0208791 A1    Jul. 31, 2014

(30) Foreign Application Priority Data

Jan. 29, 2013  (JP) .................................. 2013-014567

(51) Int. Cl.
*F24H 4/02*  (2006.01)
*C21D 7/12*  (2006.01)
*B21D 41/02*  (2006.01)

(52) U.S. Cl.
CPC .. *F24H 4/02* (2013.01); *C21D 7/12* (2013.01); *B21D 41/02* (2013.01)

(58) Field of Classification Search
CPC .......... F24H 4/02; B21D 41/00; B21D 41/02; B21D 41/04; C21D 7/12
USPC .............. 62/324.6, 225, 198, 513; 285/382.5, 285/386, 247
See application file for complete search history.

(56) References Cited

U.S. PATENT DOCUMENTS

| | | | | |
|---|---|---|---|---|
| 4,124,230 | A * | 11/1978 | Ahlstone .......................... | 285/18 |
| 5,052,190 | A * | 10/1991 | Gregory .......................... | 62/225 |
| 5,222,769 | A * | 6/1993 | Kaempen ........................ | 285/45 |
| 5,634,349 | A * | 6/1997 | Kakehashi et al. ............. | 62/198 |
| 6,022,054 | A * | 2/2000 | Hemphill et al. .............. | 285/398 |
| 6,648,076 | B2 * | 11/2003 | Broome ......................... | 166/386 |
| 7,887,099 | B2 * | 2/2011 | Kurata et al. ............... | 285/123.3 |
| 2001/0040377 | A1 * | 11/2001 | Bandlow et al. ............. | 285/319 |
| 2003/0062402 | A1 | 4/2003 | Takahashi et al. | |
| 2004/0262923 | A1 * | 12/2004 | Hegler .......................... | 285/374 |
| 2008/0106096 | A1 * | 5/2008 | Gill ............................... | 285/321 |
| 2010/0126705 | A1 * | 5/2010 | Furui et al. .................... | 165/157 |
| 2010/0229662 | A1 * | 9/2010 | Brower ........................ | 73/865.8 |
| 2010/0283234 | A1 * | 11/2010 | Tonkin et al. .................. | 285/31 |

FOREIGN PATENT DOCUMENTS

| | | |
|---|---|---|
| JP | 2003-094113 A | 4/2003 |
| JP | 2007-085400 A | 4/2007 |

OTHER PUBLICATIONS

"Air-to-water Heat Pump Systems", Nov. 2012, Mitsubishi Electric Corporation.

* cited by examiner

*Primary Examiner* — Mohammad M Ali
(74) *Attorney, Agent, or Firm* — Posz Law Group, PLC

(57) ABSTRACT

In a heating medium utilizing apparatus utilizing heating medium heated by a heating device, it is aimed to provide a pipe which achieves both of the strength of a connection part to an external pipe and the ease of pipe layout without increasing a manufacturing time. On a tip portion of an internal pipe through which the heating medium or fluid to be heat-exchanged with the heating medium flows, a pipe expanding process to expand a pipe diameter and a pipe shrinking process to shrink the pipe diameter are carried out, thereby forming the connection part to be connected to the external pipe connected to external equipment by work hardening.

4 Claims, 4 Drawing Sheets

HEATING MEDIUM UTILIZING APPARATUS

CROSS-REFERENCE TO RELATED APPLICATIONS

This application is based on and claims the benefit of priority from Japanese Patent Application No. 2013-014567, filed in Japan on Jan. 29, 2013, the content of which is incorporated herein by reference in its entirety.

TECHNICAL FIELD

The present invention relates to a heating medium utilizing apparatus utilizing heating medium, such as a water heater heating water in a tank using heating medium heated by a heating device, a heating apparatus delivering heating medium heated by a heating device to a floor heating panel, a radiator, and so on for heating. In particular, the present invention relates to, in the heating medium utilizing apparatus, connection technique of pipe to be connected with external equipments such as the heating device, the floor heating panel, the radiator, and so on.

BACKGROUND ART

In case of installing the heating medium utilizing apparatus at an installation site, a pipe connection part is often connected by a ring-type joint. As for the ring-type joint, a brass ring is compressed and deformed by nut and a copper pipe to be sealed, and thus the copper pipe needs to have a hardness being higher than the brass ring.

Patent Literature 1 describes that the copper pipe is processed, thereby producing a joint without using brass. Further, at the time of setting-up the ring-type joint, to avoid water leakage caused by deformation of the copper pipe, some products of copper pipe are made of H material to be used for a local pipe connection part.

CITATION LIST

Patent Literature

Patent Literature 1: JP2007-85400A

SUMMARY OF INVENTION

Technical Problem

When the copper pipe of H material is used, the hardness of the local connection part is sufficient; however, bending process cannot be done, or a bending radius has to be large, and thus the strength of the connection part and easy pipe layout within an apparatus cannot be achieved at the same time. Therefore, a soft copper pipe made of O material or OL material is used for a part which needs bending within the apparatus, the copper pipe of H material is used only for the connection part to an external equipment; the two types of copper pipes are connected by brazing. In this case, the connection needs two steps of bending and brazing by different manufacturing apparatuses, which causes a problem that the manufacturing time is long including a time for changing steps.

The present invention aims to achieve both of the strength of the connection part and the easy pipe layout within the apparatus, without increasing the manufacturing time.

Solution to Problem

According to the present invention, a heating medium utilizing apparatus utilizing heating medium heated by a heating device, the heating medium utilizing apparatus includes:

an internal pipe through which the heating medium or fluid that has been heat-exchanged with the heating medium flows; and a connection part provided at a tip portion of the internal pipe to be connected to an external pipe connected to the heating device or another external equipment, the connection part formed by carrying out, on the tip portion, a pipe expanding process to expand a pipe diameter and a pipe shrinking process to shrink the pipe diameter.

Advantageous Effects of Invention

In a heating medium utilizing apparatus according to the present invention, a pipe expanding process and a pipe shrinking process are carried out to harden a tip portion of an internal pipe, thereby forming a connection part. Accordingly, there is no need to use the copper pipe made of H material having the high hardness for the connection part, but the internal pipe can be formed only by the copper pipe made of such as O material or OL material. Therefore, the two steps by different manufacturing apparatuses are unnecessary, which does not increase the manufacturing time, and thus the strength of the connection part and the easy pipe layout within the apparatus can be both achieved.

BRIEF DESCRIPTION OF DRAWINGS

The present invention will become fully understood from the detailed description given hereinafter in conjunction with the accompanying drawings, in which.

DESCRIPTION OF EMBODIMENTS

Figure 1:
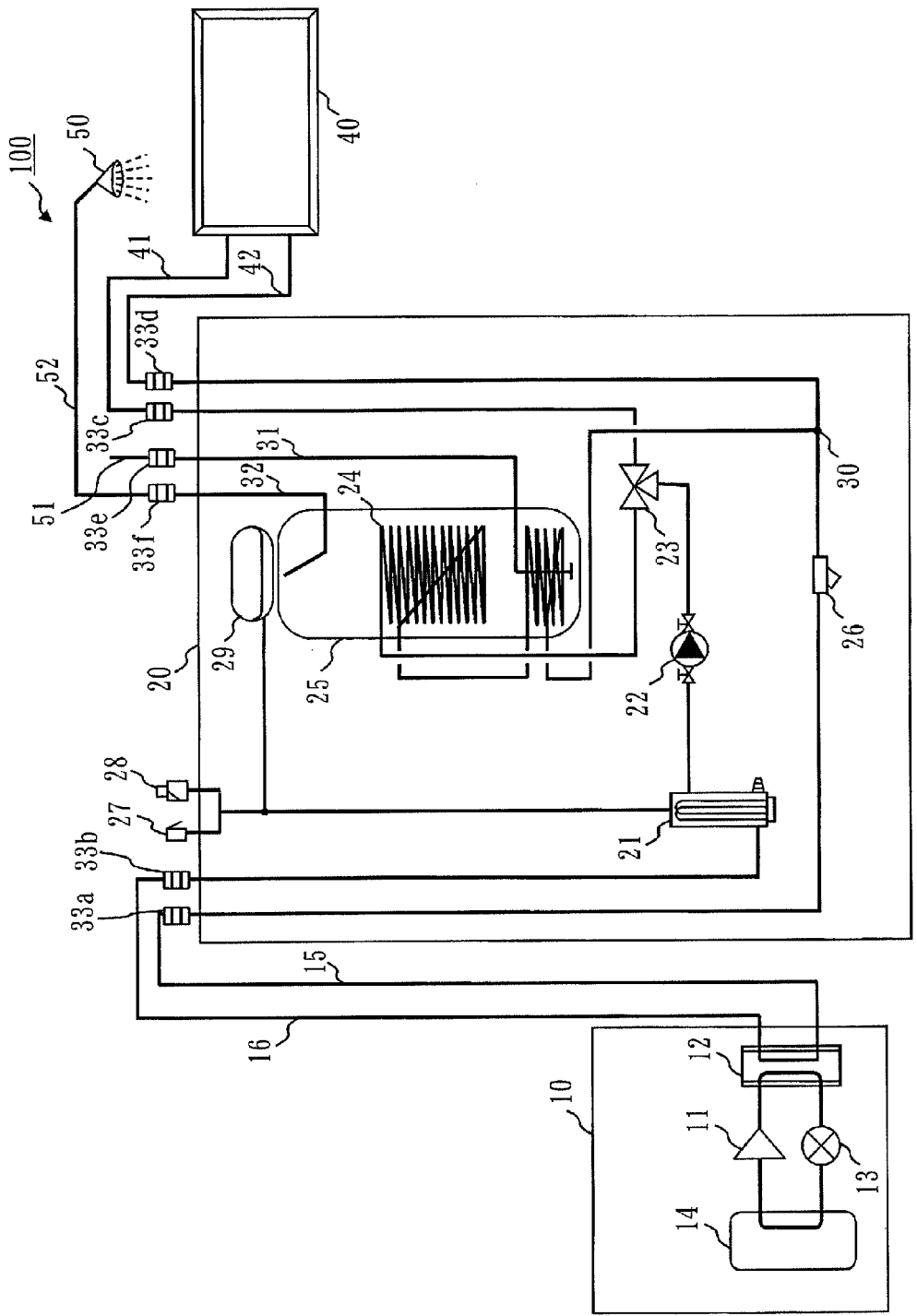
FIG. 1 is a configuration diagram showing a hot water supply heating system 100 according to a first embodiment.

In describing a preferred embodiment illustrated in the drawings, specific terminology is employed for the sake of clarity. However, the disclosure of the present invention is not intended to be limited to the specific terminology so selected, and it is to be understood that each specific element includes all technical equivalents that operate in a similar manner and achieve a similar result.

Embodiment 1

FIG. 1 is a configuration diagram showing a hot water supply heating system 100 according to the first embodiment.

The hot water supply heating system 100 includes a heat pump apparatus 10, a heating medium utilizing apparatus 20, a radiator 40, and a shower 50.

The heat pump apparatus 10 includes a compressor 11, a heat exchanger 12, an expansion valve 13, and a heat exchanger 14. The heating medium utilizing apparatus 20 includes an auxiliary heater 21, a pump 22, a three-way valve 23, a coil 24, a tank 25, a strainer 26, a pressure relief valve 27, an air relief valve 28, and an expansion tank 29.

The compressor 11, the heat exchanger 12, the expansion valve 13, and the heat exchanger 14 are connected in series by pipe, thereby forming a refrigerant circuit in which refrigerant circulates. The heat exchanger 12, the auxiliary heater 21, the pump 22, the three-way valve 23, the coil 24 in the tank 25, and the strainer 26 are connected in series by pipe, thereby forming a water circuit in which water (an example of the heating medium) circulates. Further, branched at the three-way valve 23, a heating circuit is provided, which connects the radiator 40 in the middle of the path and which merges onto a merging point 30 located between the coil 24 and the strainer 26. To a lower part of the tank 25, a cold water inlet pipe 31 to which cold water is supplied is connected, and to an upper part of the tank 25, a hot water outlet pipe 32 delivering hot water to the shower 50 is connected.

When the hot water supply heating system 100 is installed at the installation site, the pipes 15 and 16 (an example of the external pipe 64 of FIG. 4) connected to the heat exchanger 12 of the heat pump apparatus 10 are connected respectively to the connection parts 33a and 33b of the heating medium utilizing apparatus 20. Further, the pipes 41 and 42 (an example of the external pipe 64 of FIG. 4) connected to the radiator 40 are connected respectively to the connection parts 33c and 33d of the heating medium utilizing apparatus 20. Further, the pipe 51 (an example of the external pipe 64 of FIG. 4) connected to the water source is connected to the connection part 33e of the heating medium utilizing apparatus 20, and the pipe 52 (an example of the external pipe 64 of FIG. 4) connected to the shower 50 is connected to the connection part 33f of the heating medium utilizing apparatus 20.

Figure 2:
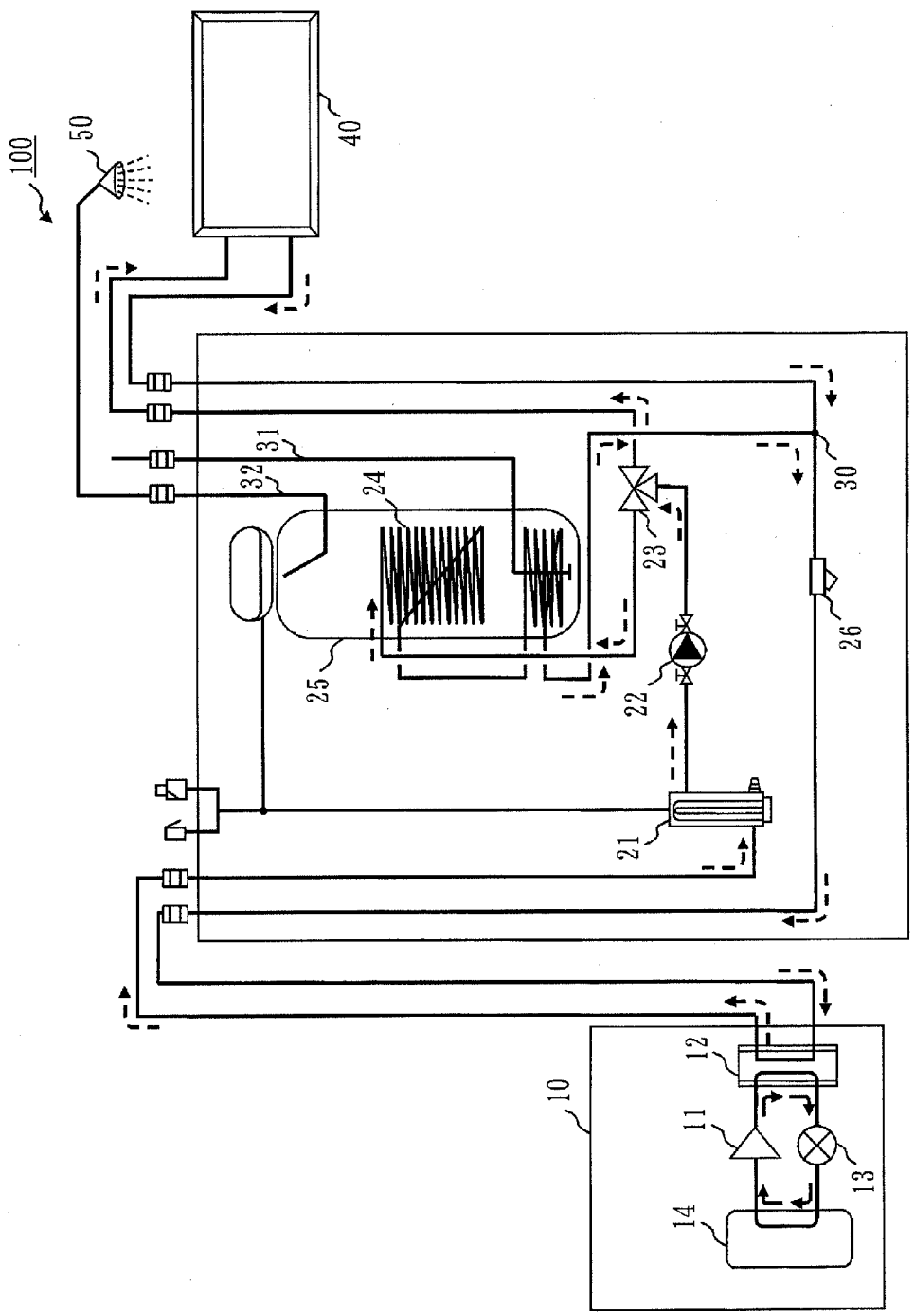
FIG. 2 is an explanatory diagram of an operation of the hot water supply heating system 100 shown in FIG. 1.

FIG. 2 is an explanatory diagram of the operation of the hot water supply heating system 100 shown in FIG. 1.

In FIG. 2, a solid-line arrow shows a flow of the refrigerant, and a broken-line arrow shows a flow of water.

In the refrigerant circuit, the refrigerant with high temperature and high pressure discharged from the compressor 11 is flown into the heat exchanger 12. Then, in the heat exchanger 12, the water circulating in the water circuit is heated and the refrigerant is cooled. The cooled refrigerant passes through the expansion valve 13, is expanded into gas-liquid two-phase, and flown into the heat exchanger 14. In the heat exchanger 14, the refrigerant is heated by the outdoor air. The heated refrigerant is sucked by the compressor 11, and the refrigerant has become high temperature and high pressure again.

In the water circuit, the water (hot water) heated by the heat exchanger 12 passes through the auxiliary heater 21, and is further heated. The heated water passes through the pump 22 and the three-way valve 23, and is flown into the coil 24. In the coil 24, the water in the tank is heated, and the water circulating in the water circuit is cooled. The cooled water passes through the strainer 26, and is flown into the heat exchanger 12 again.

Figure 3:
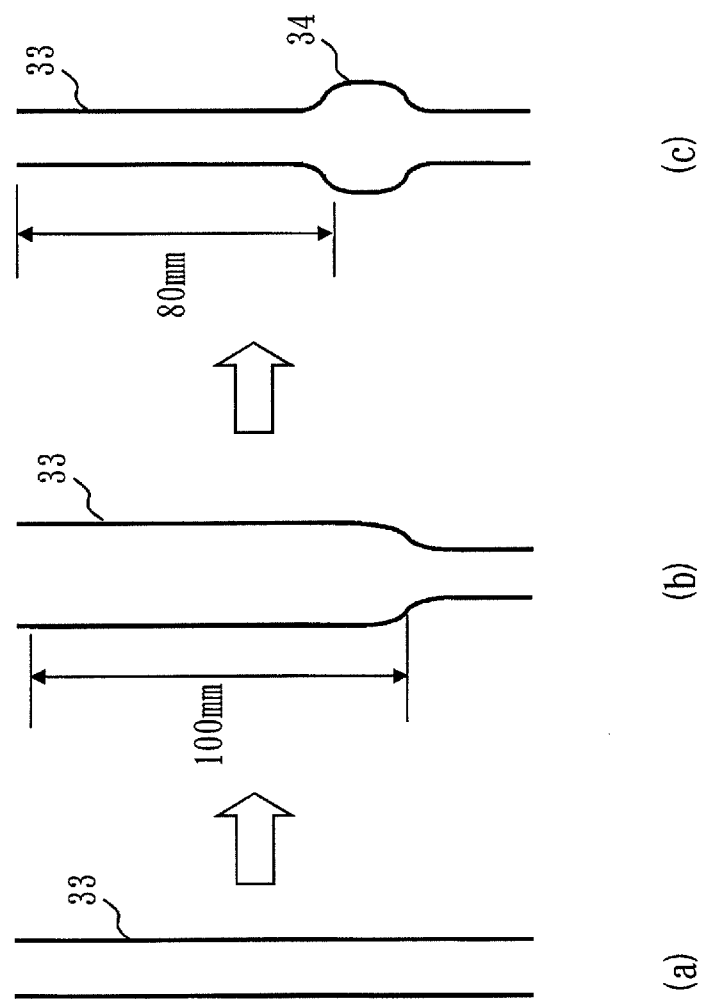
FIG. 3 is an explanatory diagram of a connection part 33 (33a to 33f of FIG. 1).

Further, a part of the water passing through the three-way valve 23 is flown into the radiator 40. In the radiator 40, the air of the room where the radiator 40 is installed is heated, and the water circulating in the water circuit is cooled. The cooled water merges to the water passing through the coil 24 at the merging point 30. FIG. 3 is an explanatory diagram of the connection part 33 (the connection parts 33a to 33f).

(a) of FIG. 3 shows status before a processing (the original status), (b) of FIG. 3 shows status after a pipe expanding process, and (c) of FIG. 3 shows status after a pipe shrinking process.

The connection part 33 is formed at a tip portion of the pipe that forms the water circuit, the cold water inlet pipe 31, and the hot water outlet pipe 32. The tip portion is a part of the pipe within a range of, for instance, 100 mm from the tip.

First, on the pipe within the range of 100 mm from the tip, the pipe expanding process is carried out to expand a pipe diameter by 13 to 17%, and thus the status is changed from (a) of FIG. 3 to (b) of FIG. 3. Next, on the pipe within the range of 80 mm from the tip, the pipe shrinking process is carried out to shrink the pipe diameter by 13 to 17%, and thus the status is changed from (b) of FIG. 3 to (c) of FIG. 3.

By the above operation, the pipe within the range of 80 mm from the tip comes to have approximately the same pipe diameter as the pipe of the original status; the pipe within the range of 20 mm on which the pipe expanding process is carried out but the pipe shrinking process is not carried out becomes a swelling 34 which has a pipe diameter larger than the pipe of the original status.

The connection part 33 is formed by carrying out the pipe expanding process and the pipe shrinking process, and thus the hardness is increased compared with the original status because of the work hardening.

For instance, if a copper pipe of OL material having an external diameter of 22 mm is expanded to the external diameter of around 25 mm, and then shrunk to the external diameter of around 22 mm; when measured by the Vickers hardness, the hardness of the original status is around 60, the hardness after the expanding process is around 90, and the hardness after shrinking process (the shrunk portion) is around 110.

The hardness like H material is sufficient to withstand fastening by the ring-type joint. Since the hardness of the H material is around 104, the hardness 110 of the shrunk portion is higher than the hardness of the H material. Therefore, the shrunk portion withstands fastening by the ring-type joint.

Figure 4:
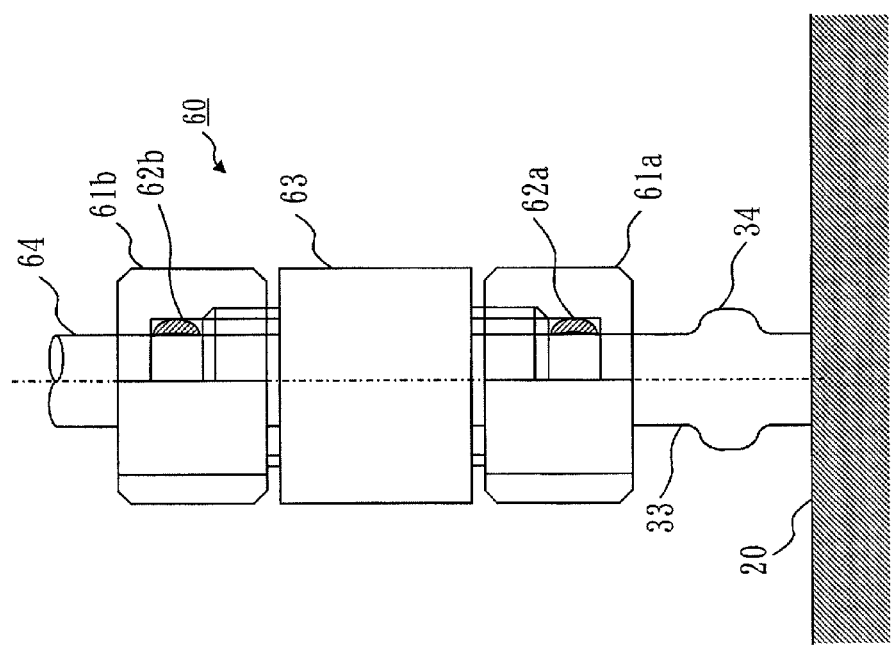
FIG. 4 is an explanatory diagram of a ring-type joint 60 which connects the connection part 33 and an external pipe 64.

FIG. 4 is an explanatory diagram of the ring-type joint 60 that connects the connection part 33 and the external pipe 64.

In FIG. 4, a left half shows a frontal view of the ring-type joint 60, and a right half shows an inside of the ring-type joint 60.

The ring-type joint 60 includes nuts 61a and 61b, rings 62a and 62b, and a joint main body 63.

When the connection part 33 and the external pipe 64 are connected, the connection part 33 is inserted to the ring 62a, the external pipe 64 is inserted to the other ring 62b, and the nuts 61a and 61b are fastened. Then, by fastening the nuts 61a and 61b, the rings 62a and 62b are deformed and adhered to the connection part 33 and the external pipe 64. Accordingly, the connection part 33 and the external pipe 64 are connected.

Here, the tip portion of the connection part 33 is provided with an opening so that the opening directs vertically upwardly. Therefore, the swelling 34 is located beneath the connection part 33.

When the connection part 33 and the external pipe 64 are connected, while the connection part 33 is inserted to the ring 62a of the ring-type joint 60, the connection part 33 does not fall down even if the connection part 33 is not supported by hand, since the nut 61a is caught by the swelling 34. That is, the swelling 34 works as a stopper for the nut 61. Therefore, the connection work becomes easier.

As discussed above, in the hot water supply heating system 100 according to the first embodiment, the heating medium utilizing apparatus 20 is configured to have the connection part 33 hardened by the processing. Therefore, the connection part 33 having the high hardness and a part which is bendable can be formed by one pipe.

Here, in the foregoing explanation, the heating medium utilizing apparatus 20 of the hot water supply heating system 100 has been explained. However, the above technique can be applied to the heating medium utilizing apparatus 20 of a hot water supply system to which the radiator 40 is not connected or a heating system without having the tank 25 and the like.

Numerous additional modifications and variations are possible in light of the above teachings. It is therefore to be understood that, within the scope of the appended claims, the disclosure of this patent specification may be practiced otherwise than as specifically described herein.

REFERENCE SIGNS LIST

100: hot water supply heating system; 10: heat pump apparatus; 11: compressor; 12: heat exchanger; 13: expansion valve; 14: heat exchanger; 15, 16: pipes; 20: heating medium utilizing apparatus; 21: auxiliary heater; 22: pump; 23: three-way valve; 24: coil; 25: tank; 26: strainer; 27: pressure relief valve; 28: air relief valve; 29: expansion tank; 30: merging point; 31: cold water inlet pipe; 32: hot water outlet pipe; 33: connection part; 34: swelling; 40: radiator; 41, 42: pipes; 50: shower; 51, 52: pipes; 60: ring-type joint; 61: nut; 62: ring; 63: joint main body, and 64: external pipe.

The invention claimed is:

1. A heating medium utilizing apparatus utilizing heating medium heated by a heating device, the heating medium utilizing apparatus comprising:

an internal pipe through which the heating medium or fluid that has been heat-exchanged with the heating medium flows; and a connection part provided at a tip portion of the internal pipe to be connected to an external pipe connected to the heating device or another external equipment, the connection part formed by carrying out, on the tip portion, a pipe expanding process to expand a pipe diameter and a pipe shrinking process to shrink the pipe diameter.

2. The heating medium utilizing apparatus of claim 1, wherein the tip portion of the connection part is provided with an opening so that the opening directs upwardly, and the connection part is formed by, after expanding the pipe diameter of the tip portion by the pipe expanding process, carrying out the pipe shrinking process only on a part of an upper part of the tip portion on which the pipe expanding process has been carried out.

3. The heating medium utilizing apparatus of claim 1, wherein the connection part is formed by, after carrying out the pipe expanding process to expand the pipe diameter of the tip portion of the internal pipe by 13 to 17%, carrying out the pipe shrinking process to shrink the pipe diameter of the tip portion of the internal pipe by 13 to 17%.

4. The heating medium utilizing apparatus of claim 1, wherein the heating device is a heat pump apparatus which absorbs heat from outdoor air and heats refrigerant which is the heating medium.

* * * * *